United States Patent
Thakker et al.

(10) Patent No.: US 9,330,152 B2
(45) Date of Patent: May 3, 2016

(54) GRID LOADER PROCESS

(71) Applicant: Cellco Partnership, Arlington, VA (US)

(72) Inventors: Divyesh S. Thakker, Lebanon, NJ (US); Sumit Sood, Plainsboro, NJ (US); Narmada Pulipati, Edison, NJ (US); Jagadeesh Chilakapati, Randolph, NJ (US); Chitaranjan Varadhan, North Brunswick, NJ (US); Madhu Jetti, Piscataway, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 282 days.

(21) Appl. No.: 13/845,900

(22) Filed: Mar. 18, 2013

(65) Prior Publication Data

US 2014/0280381 A1 Sep. 18, 2014

(51) Int. Cl.
*G06F 7/00* (2006.01)
*G06F 17/30* (2006.01)

(52) U.S. Cl.
CPC ................................. *G06F 17/30569* (2013.01)

(58) Field of Classification Search
CPC ............ G06F 17/30569; G06F 17/303; G06F 17/30563
See application file for complete search history.

(56) References Cited

U.S. PATENT DOCUMENTS

| | | | | |
|---|---|---|---|---|
| 7,548,898 | B1* | 6/2009 | Tarenskeen | G06F 17/303 |
| 7,613,707 | B1* | 11/2009 | Peddy et al. | |
| 8,006,061 | B1* | 8/2011 | Chatterjee et al. | 711/170 |
| 2006/0277180 | A1* | 12/2006 | Okamoto | 707/7 |
| 2009/0077114 | A1* | 3/2009 | Zachariah | 707/102 |
| 2011/0191389 | A1* | 8/2011 | Okamoto | G06F 17/303 707/809 |
| 2013/0055197 | A1* | 2/2013 | Balan et al. | 717/105 |
| 2014/0369360 | A1* | 12/2014 | Carlstrom | H04L 12/5693 370/412 |

* cited by examiner

*Primary Examiner* — Tuan A Pham (57) ABSTRACT

A datagrid loading system contains a device including a processor and a memory with a management application installed thereon. The instructions of the management application when executed by the processor cause the processor to accumulate data from a first database, the data configured to be and include an identifier that is particular to the first database, and distribute the data into buckets by an integrated heuristic of the management application, the integrated heuristic and the buckets configured according to database characteristics particular to a second database that is different from the first database, the integrated heuristic further configured to distribute the data based on the identifier.

11 Claims, 3 Drawing Sheets

GRID LOADER PROCESS

BACKGROUND

Moving large amounts of data between incompatible data environments requires significant amounts of time and processing resources and is prone to potential errors because of implementation complexity. For example, when transferring large data amounts from a relational database environment to an in-memory object cache database environment, the data must be read row-by-row from the relational database environment and sequentially processed by the in-memory object cache database environment. A total time to execute this row-by-row transfer for 400 gigabytes of data has been determined to exceed 20 hours. And although multiple row-by-row transfer threads may be simultaneously executed, each thread still commandeers significant amounts of processing resources from both the relational and memory database environments during the transfers.

DETAILED DESCRIPTION

An exemplary datagrid loading system and method that simplifies the movement of large amounts of data between incompatible data environments. The exemplary datagrid loading system and method may employ a management application to integrate converting data acquired from a first environment into buckets configured for a second environment with transferring each bucket to the second environment when the predefined size limit for each bucket is reached.

In this manner, the exemplary datagrid loading system and method enables the conversion of "many" database partition segments of the first environment into "many" datagrid partition segments of the second environment, which reduces the use of processing resources in both environments. Further, because the movement of large data amounts between the first and second environments is simplified, the operational amount of time is reduced in comparison to moving data by a row-by-row read and a sequential processing.

The first and second environments are data store environments that may be incompatible for one-to-one data transfers between each other. An example of incompatible environments may be illustrated by way of two database schemes such as a disk-storage scheme and an in-memory object cache scheme. A disk-storage scheme (sometimes known as external memory storage) is based on memory external to a central processing unit of a database being accessed through input/output channels of the central processing unit. In contrast, an in-memory object cache scheme is based on memory being directly connected to the central processing unit via a memory bus. These different physical locations result in different data management configurations, including different memory addressing.

Therefore, a memory address identifying a location of data in the first database scheme for the first environment would not be usable to access equivalent data in the second environment that utilizes an incompatible second database scheme. Yet, although these schemes are different, the disclosed datagrid loading system and method may identify and utilize a relationship between each scheme (e.g., related identifiers or keys). That is, if a first database scheme were to utilize the same or similar identifiers as the second database scheme, these identifiers may be utilized as a "key" for simplifying data transfers between disparate database configurations.

Figure 1:
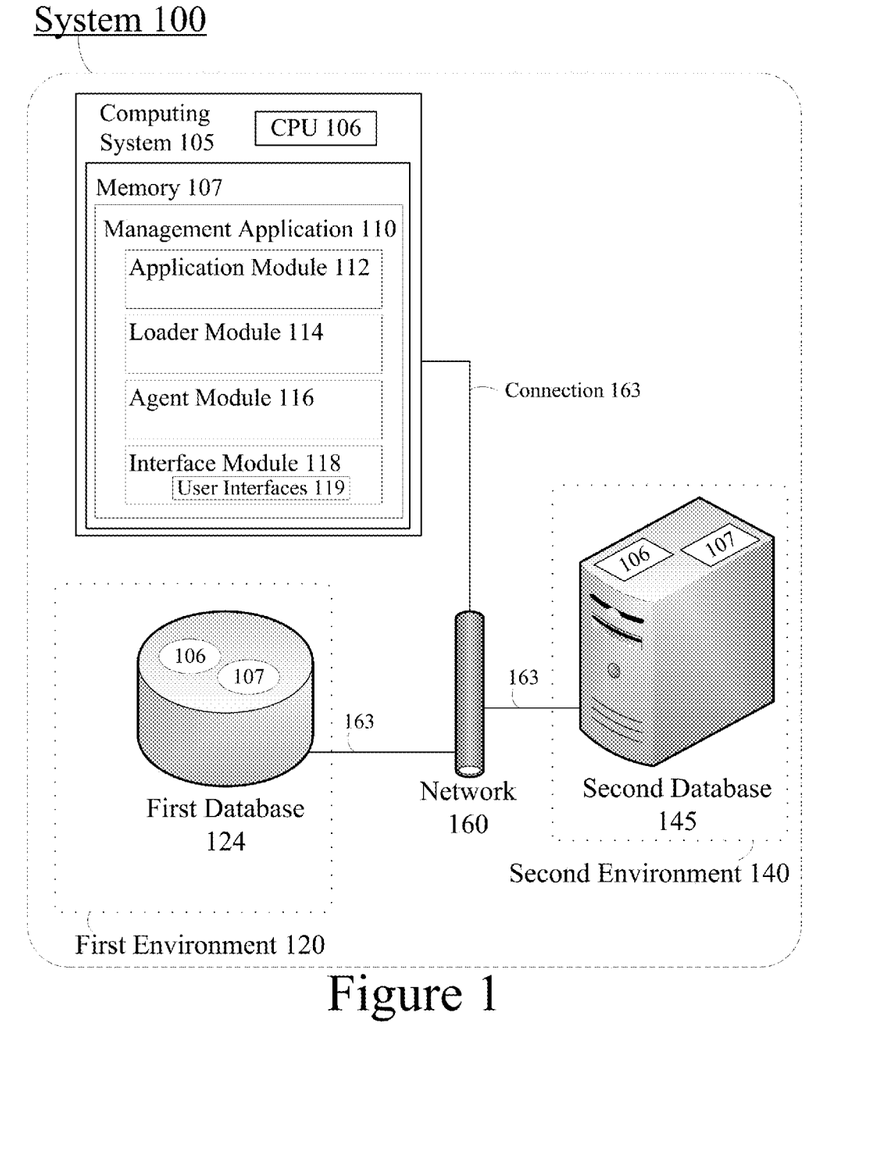
FIG. 1 illustrate an exemplary system in which a management application operates.

FIG. 1 illustrates an exemplary datagrid loading system 100 having a computing system 105, a first environment 120, and a second environment 140 connected via one or more networks 160.

In the exemplary datagrid loading system 100, the first and second environments 120, 140 operate incompatible database schemes that include at least one database 124,145, which are representative of multiple computing systems working collectively to manage and store data. To transfer particular data from the first environment 120 to the second environment 140, the first environment would utilize its relative database scheme to independently to look-up, access, and the particular data. Then the first environment 120 transfers the particular data by utilizing the network 160 to the second environment 140 (e.g., the network providing the physical and logical connections to carry data from a database 124 to database 145). Once received, the second environment 140 would have to independently convert the particular data to the local scheme by splitting the data via a local conversion code. Next, the second environment 140 would re-address the converted data according to its relative database scheme and then insert the converted data into the second data environment 140. The first and second environments 120, 140 operate incompatible data schemes for one-to-one data transfers (e.g., transfer without conversion), as illustrated by the dashed-line of the first environment 120 vs. the dotted-line of the second environment 140 and the distinguished shapes of databases 124, 145.

Because of the disparate configurations, the management application 110 of the computing system 105 may identify at least one similar identifier (e.g., a key) for each environments 120, 140. The management application 110 may then utilize the key to split the data acquired from a first database 124 of the first environment 120 into buckets configured for storage on a second database 145 of the second environment 140. The management application 110 may further utilize connections 163 of the network to acquire data from the first environment 120 and transfer "filled" buckets to the second environment 140. Thus, the computing system 105 along with management application 110 may be used to move data from the first environment to the second environment.

The exemplary computing system 105 may be any computing system and/or device, which includes a processor and a memory (e.g., central processing unit 106 and memory 107 described below), that enables the management application 110 to acquire, process, and transfer data. In general, computing systems and/or devices may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing systems and/or devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, Procedural Language/Structured Query Language (PL/SQL), etc.

The exemplary datagrid loading system 100 and the exemplary computing system 105 may take many different forms and include multiple and/or alternate components and facilities. While exemplary systems are shown in the figures, the exemplary components illustrated are not intended to be limiting. Indeed, additional or alternative components and/or implementations may be used. For instance, the computer system 105 may be separate from or actually integrated into either the first environment 120 or the second environment 140. Further, in some examples, computing system 105 elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The central processing unit (CPU) 106 may be, in general, be any processor or microprocessor that receives instructions from a memory (e.g., memory 107 described below) and executes these instructions, thereby performing one or more processes, including one or more of the processes described herein. Such instructions and other data may be stored and transmitted using a variety of computer-readable media. The CPU 106 may also include processes comprised from any hardware, software, or combination of hardware or software that carries out instructions of a computer programs by performing logical and arithmetical calculations, such as adding or subtracting two or more numbers, comparing numbers, or jumping to a different part of the instructions. The CPU 106 may be any one of, but not limited to single, dual, triple, or quad core processors (on one single chip), graphics processing units, visual processing units, and virtual processors. In addition, a CPU 106 is illustrated in each of the computing systems of FIG. 1 (e.g., computing system 105, database 124, and database 145)

The memory 107 may be, in general, any computer-readable medium (also referred to as a processor-readable medium) that may include any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include optical or magnetic disks and other persistent memory. Volatile media may include dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. In addition, a memory 107 is illustrated in each of the computing systems of FIG. 1 (e.g., computing system 105, database 124, and database 145)

The management application 110 (herein referred to as application 110) may be software stored in the memory 107 of the computing system 105 and executed by the CPU 106 of the computing system 105. When the management application 110 is executed by the CPU 106, the processor is caused to perform one or more of the processes described herein. In operation, the application 110 may be configured to cause the CPU 106 to connect via an application module 112 and network 160 with the first environment 120 and acquire data from at least the database 124.

The application 110 may then cause the CPU 106 to utilize a loader module 114 to queue the data as it is being acquired from the database 124, and split the data into buckets configured for the second environment 140. An agent module 116 of the application 110 may cause the CPU 106 to manage the buckets such that when they are "filled" (e.g., the data in the bucket equals a predefined size limit or when there is no more data within the loader) the buckets are transferred to the second environment 140 via the application module 112 and the network 160.

In general, the application 110 may be configured to cause the CPU 106 to move large data amounts from a relational database environment to a memory database environment in a reasonable amount of time via a datagrid loading process. More particularly, the application 110 may be configured to cause the CPU 106 to acquire data from a relational database management system (RDBMS) according to a structure of the RDBMS, repartition the data according to a structure of a main memory database system (MMDB), and populate the MMDB with the repartitioned data in an operational amount of time. The operational amount of time may be a target time for which the application 110 may cause the CPU 106 to complete the move of large data amounts.

Regarding acquiring data (e.g., rows/messages/objects) from the first environment 120, the application 110 via an application module 112 may read data directly from the database 124 of the first environment 120, where the data may be arranged as database table partitions (e.g., data structures that contain data blocks according to keys particular to database 124) particular to the first environment 120, as described below.

A key may be one or more particular data fields chosen as identifiers from a database model. A database model may be partition table listing the characteristics of each data field for the database scheme. The data fields are the containers that store information particular to a record. Thus, by choosing a particular set of data fields as a key, a database may arrange the records in partitions according to information in the particular set of data fields. Keys may generally be chosen from the data fields based on a data field's ability to uniquely identify a record.

In addition, the application 110 may be configured to cause the CPU 106 to generate and operate a single queue (e.g., master queue) in the memory 107 that is a destination for all data coming out of the first environment 120 to the application 110. The master queue may be any data type in which data is kept in order. For example, the master queue may operate based on the addition of data to the rear terminal position and removal of data from the front terminal position (e.g., a First-In-First-Out data structure). The application 110 may then cause the CPU 106 to utilize the loader module 114 to repartition (e.g., manage and split based on a hash heuristic) the data in the master queue and the agent module 116 to populate the second environment 140, as described below.

The application module 112 may be configured to facilitate communication between the modules of the application 110 and hardware/software components external to the application 110. For instance, the application module 112 may be configured to communicate directly with other applications, modules, models, devices, systems, and other sources through both physical and virtual interfaces. The application module 112 may include program code and specifications for routines, data structures, object classes, and variables that receive, package, present, and transfer data through a connection or over a network, as described below.

The application module 112 may also acquire, retrieve, or receive data from amongst the first and second environments 120, 140 through the network 160 via connections 163. Particularly, the application module 112 may fetch data from the database 124, which is partitioned particular to the structure of database 124, by utilizing a Java Database Connectivity (JDBC) driver. A JDBC driver is a software component enabling a Java application to interact with a database by giving out the connection to the database 124 and implementing the protocol for transferring a query and result between the application 110 and database 124. Other program code and specifications of the application module 112 may include open database connectivity drivers, object linking and embedding database drivers, and the like.

The loader module 114 may be configured to implement a queue splitting process. That is, the loader module 114 may parse the data off the master queue and split the data intelligently to a correct bucket (e.g., split the data according to a structure of a database 145 and utilizing the keys particular to database 124). A bucket, similar to the master queue, may be any data type in which data is kept in order; however, buckets may be more particular to a division of a logical database or its constituting elements into distinct independent parts (e.g., a bucket may be a group or partition segment of a larger database, sometimes referred to as batched data). The buckets or batches may be configured to include predefined size limits that restrict the amount of data distributed into the bucket by the loader.

For example, the loader module 114 may store and implement an integrated hash heuristic 115 based on the second environment 140 to convert or digest the data stored in the master queue, which is still in the format of the first environment, into a format suitable to the second environment 140. In general, a hash heuristic may be any methodology or subroutine that maps data of variable length to data sets of a fixed length (e.g., hash values). Thus, the integrated hash heuristic 115 may manipulate the data of the master queue, such that the data may be split or distributed into buckets based on their computed hash values (e.g., horizontal partitioning).

The loader module 114 may further implement the integrated hash heuristic 115 on the data of the master queue according hash tables or other data structures that implement business logic (e.g., data may be read from the master queue based on keys, such as mobile director number, Account number, customer identification level, or other parameters). The queue splitting process by the loader module 114 may enable parallel processing across multiple systems, environments, and/or databases while guaranteeing that a data sequence is even by routing all related data to a corresponding bucket. Buckets (e.g., batches or discrete datagrid batches) are groups of data addressed according or corresponding to the second environment 140. When the second environment 140 receives a bucket, the data within the bucket may be efficiently inserted into the second environment 140 without additional processing by the second environment 140 (e.g., the second environment 140 does not have to convert and re-address the data).

The agent module 116 may be configured to collect the data distributed by the loader module 114 into buckets and push the buckets to the second environment 140 when the amount of data meets a predefined size limit. The predefined size limit may be a bucket size or datagrid batch size that was selected before the execution of a particular datagrid loading process iteration.

Different datagrid batch sizes may be identified based on the unique characteristics of the environments and the data to be transferred. For example, utilizing a series of simulations in the exemplary datagrid loading system 100, a relationship between a datagrid batch size, processing capabilities of the computing system 105, and the network characteristics of the second environment 140 and network 160 may be identified. According to observations of the simulations, a performance of the application 110 may improve with an adjustment in the datagrid batch size while being constrained by the capability of the hardware, communication, and computing resources and associated interactions of the system 100.

In configuring one exemplary illustrative simulation, testing data transfers between the databases 124, 145 was employed to find a control value for the records by loading production like data into the system 100 and repeatedly varying a batch size and noting the time taken for loading the tables. Through testing, reading 40,000 records from the database 124 was determined as a valid control for testing different batch sizes on the exemplary datagrid loading system 100, as 40,000 records balanced a load on the database 124, amount of memory used by the datagrid loading process, and the time taken to process a batch by the database 145. Thus, an optimal batch size was sought based in part on how efficiently the 40,000 records were split into different datagrid batch sizes. The simulations included testing for resulting batch sizes by partitioning 40,000 records by 250, 500, 1,000, 7,000, and 40,000 partitions over multiple iterations. Based on a total time taken for the datagrid loading process, 1,000 partitions and 7,000 partitions both rendered optimized batch sizes of 5 to 35, which would vary depending on the key values retrieved from the database 125.

The application 110 may also include an interface module 118 configured to generate and manage user interfaces 119 that control and manipulate the application 110 based on a received input. That is, the interface module 118 may include program code configured to generate, present, and provide one or more user interfaces 119 (e.g., in a menu, icon, tabular, map, or datagrid format) in connection with other modules for presenting information (e.g., data, notifications, instructions, etc.) and receiving inputs (e.g., configuration adjustments, such as inputs altering, updating, or changing the heuristics of the loader and agent modules 114, 116).

The user interfaces 119 described herein may be provided as software that when executed by the CPU 106 present and receive the information described herein. The user interfaces 119 may include local, terminal, web-based, and mobile interfaces and any similar interface that presents and provides information relative to the application 110. The user interfaces 115 may also be provided as hardware or firmware, or combinations of software, hardware and/or firmware.

For example, the interface module 118 may be configured to generate user interfaces 119 for user interaction with the application 110. The application 110 may provide on a remote computer system (e.g., terminal computer) a user interface 119 that receives configuration updates for the loader and agent modules 114, 116 and the application module 112 may connect the configuration updates to the respective module. Further, the application 110 may provide status information regarding a datagrid loading process to the user interfaces 119 for user review.

The first and second environments 120, 140, as noted above, are data store environments that may be incompatible for one-to-one data transfers between each other. That is, the environments 120,140 may include at least one database 124, 145 that manages and stores a type of data or file system, where a configuration and organization method implemented by the first environment 120 and database 124 is different than a configuration and organization method by the second environment 130 and database 145. Because of the disparate configurations, the application 110 assigns at least one key from any model of first environment 120 to be an input for the integrated hash heuristic 115, which is built according to the structure of the second environment 140, so that the record may be distributed according to the datagrid partition segment scheme of the second environment 140.

Although each environment 120, 140 illustrates one database, the first and second environments 120, 140 may include multiple databases, computing systems, and/or networks to enable operations particular to that environment.

In general, databases, data repositories, or other data stores (e.g., the first and second databases 124, 145), described herein may include various kinds of mechanisms for storing, providing, accessing, and retrieving various kinds of data, including a hierarchical database, a set of files in a file system, an application database in a proprietary format, a relational database management system (RDBMS), main memory database system (MMDB), etc. Each such data store may generally be included within a computing system (e.g., computing system 105) employing a computer operating system such as one of those mentioned above, and are accessed via a network or connection in any one or more of a variety of manners. A file system may be accessible from a computer operating system, and may include files stored in various formats.

The first database 124 may be a computing system, as described above, with a CPU 106 and a memory 107, configured as an RDBMS. An RDBMS relies on a disk storage mechanism and generally employs the Structured Query Language (SQL) in addition to a language for creating, storing, editing, and executing stored procedures, such as the PL/SQL language mentioned above. On example of an RDBMS may include Oracle RDBMS, which stores data logically in the form of tablespaces and physically in the form of data files. Tablespaces can contain various types of memory segments, such as Data Segments, Index Segments, etc. Segments in turn comprise one or more extents. Extents comprise groups of contiguous data blocks. Data blocks form the basic units of data storage. RDBMS may also include a partitioning feature that allows the partitioning of tables based on different set of keys (e.g., keys particular to database 124).

Table 1 is an exemplary RDBMS model listing the data fields for a particular RDBMS scheme, where a first column is a NAME, a second column describes the constraints for that column, and a third column is a DATA TYPE of the data field. The data fields of rows one and two were chosen as keys, where key 1 is "ORD_NO" (e.g., order number) and key 2 is "LN_ITM_NO" (e.g., line item number) are examples of keys particular to database 124. Note that although both keys in this example are integers, any data type may be utilized as a key. Also, as records are read from database 124 and stored in the master queue, the keys 1 and 2 will remain as identifiers such that the integrated hash heuristic 115 may distribute the records based on the keys identified in Table 1.

TABLE 1

PRL LOOKUP FOR RDBMS:

| NAME | NULL? | DATA TYPE |
| --- | --- | --- |
| ORD_NO | NOT NULL | INTEGER |
| LN_ITM_NO | NOT NULL | INTEGER |
| MDN | NOT NULL | VARCHAR2(20 CHAR) |
| LN_ITM_TYP_CD | NOT NULL | VARCHAR2(1 CHAR) |
| PRL_REQUEST_ID | | VARCHAR2(20 CHAR) |
| OFFR_TYP_ID | | INTEGER |
| BS_CUSTOMER_ID | NOT NULL | VARCHAR2(20 CHAR) |
| BS_ACCOUNT_NUM | NOT NULL | VARCHAR2(20 CHAR) |
| LN_ITM_CREATE_DT | | TIMESTAMP(6) |
| LN_FULFILL_REQ_DT | | TIMESTAMP(6) |
| PRL_REQUEST_ID_TYP | | VARCHAR2(3 CHAR) |

The second database 145 may be a computing system, as described above, with a CPU 106 and a memory 107, configured as an MMDB. An MMDB (a.k.a. "in-memory database") relies on main memory mechanism and generally employs internal optimization heuristics that execute fewer CPU instructions than RDBMS. One example of an MMDB may include eXtremeDB, which is a high performance, low-latency, ACID-compliant embedded database management system using an in-memory database system architecture and designed to be linked into C/C++ based programs. An example of an eXtremeDB may include IBM WebSphere eXtreme Scale, which implements a fully elastic memory based storage datagrid that virtualizes free memory of a large number of Java virtual machines and makes them behave like a single key addressable storage pool.

Table 2 is an exemplary MMDB model listing the data fields for a particular MMDB scheme. Note that although the MMDB model is different than the RDBMS, there is still a relationship between the rows of Table 1 and the rows of Table 2, for instance, the data fields of rows one and two for Table 2 have the same keys as Table 1 (e.g., key 1 is "ORD_NO" and key 2 is "LN_ITM_NO").

TABLE 2

PRL LOOKUP FOR MMDB:
<Java Class>
PrlLookupModel
serialVersionUID : long orderNo : String
lnItmNo : String
prlRequestID : String
mdn : String
offrTypID : String
lnItmTypCd : String
lnItmCreateDt : long
lnFullfillReqDt : long
billSysID : String
offrTypCD : String
bsCustomerId : String
bsAccountNum : String Utilizing Table 2, when records are distributed from the master queue, the integrated hash heuristic 115 may distribute the records based on the keys identified in Table 1 but according to a datagrid partition segment of the second database 145.

In addition, as indicated in FIG. 1, databases 124, 145 include a CPU 106 and a memory 107 that work in combination to store, provide, access, and retrieve various kinds of data. Database 124, 145 may also be provided as hardware or firmware, or combinations of software, hardware and/or firmware.

The network 160 may be a collection of computers and other hardware to provide infrastructure to establish virtual connections and carry communications. That is, the network 160 may be configured to provide an infrastructure that generally includes edge, distribution, and core devices and provides a path for the exchange of information between different devices and systems. The network 160 may be any conventional networking technology, and may, in general, be any packet network (e.g., any of a cellular network, global area network, wireless local area networks, wide area networks, local area networks, or combinations thereof, but may not be limited thereto) that provides the protocol infrastructure to carry communications between the computer system 105 and the environments 120, 140 via connections 163.

The connections 163 may be wired or wireless connections (e.g., transmission media including coaxial cables, copper wire, fiber optics, and the like) between two endpoints (devices, systems, or networks) that carry electrical signals that facilitate virtual connections. Virtual connections are comprised of the protocol infrastructure that enables communication to and from the application 110 and the first and second databases 124, 145.

Note that although the network 160 and connections 163 of FIG. 1 illustrate the computing system 105 and the databases 124, 145 as directly connected, other combinations of hardware and software may be used to connect these devices. Thus, the exemplary datagrid loading system 100 may for example be located within a single data center or in separate locations such that the computing system 105 is located in a sub-network connected via the backbone network 160 to the self-contained sub-networks of the first and second environment 120, 140.

Figure 2:
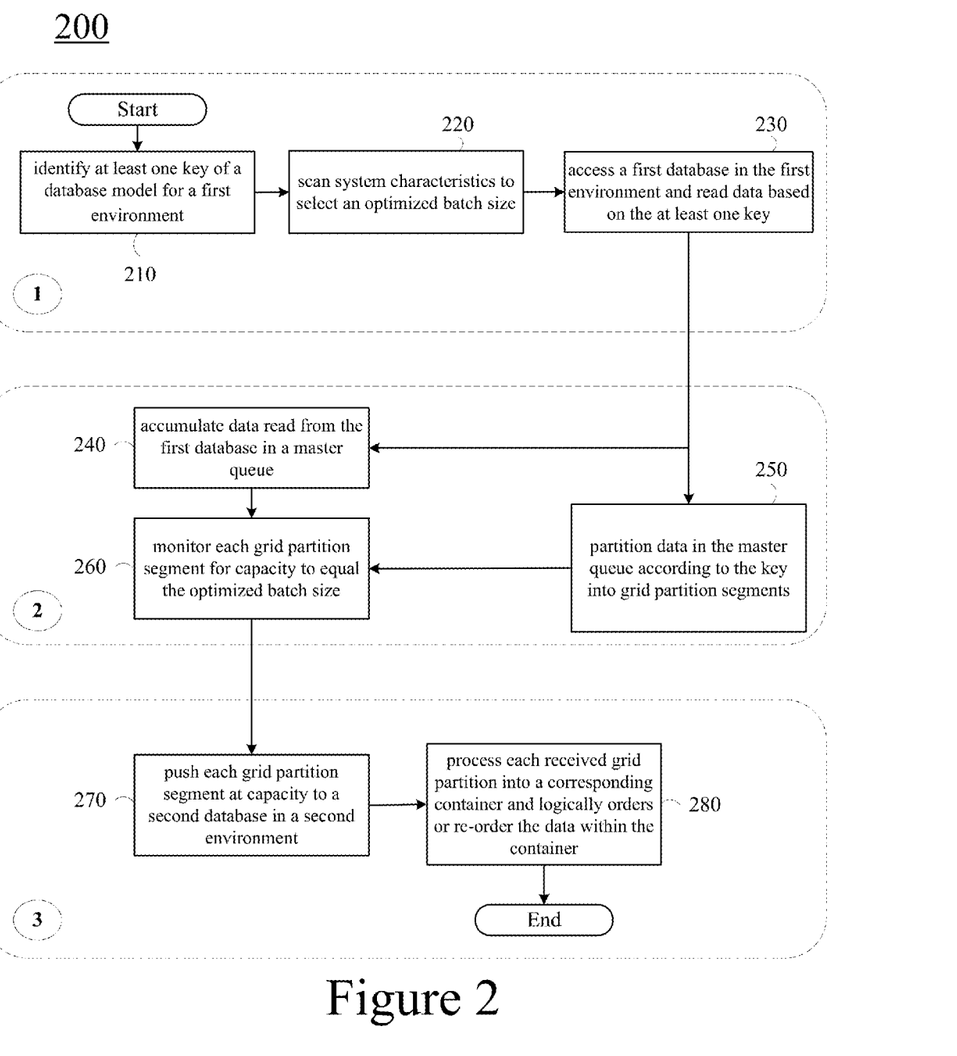
FIG. 2 illustrates an exemplary process flow executed by a management application.
Figure 3:
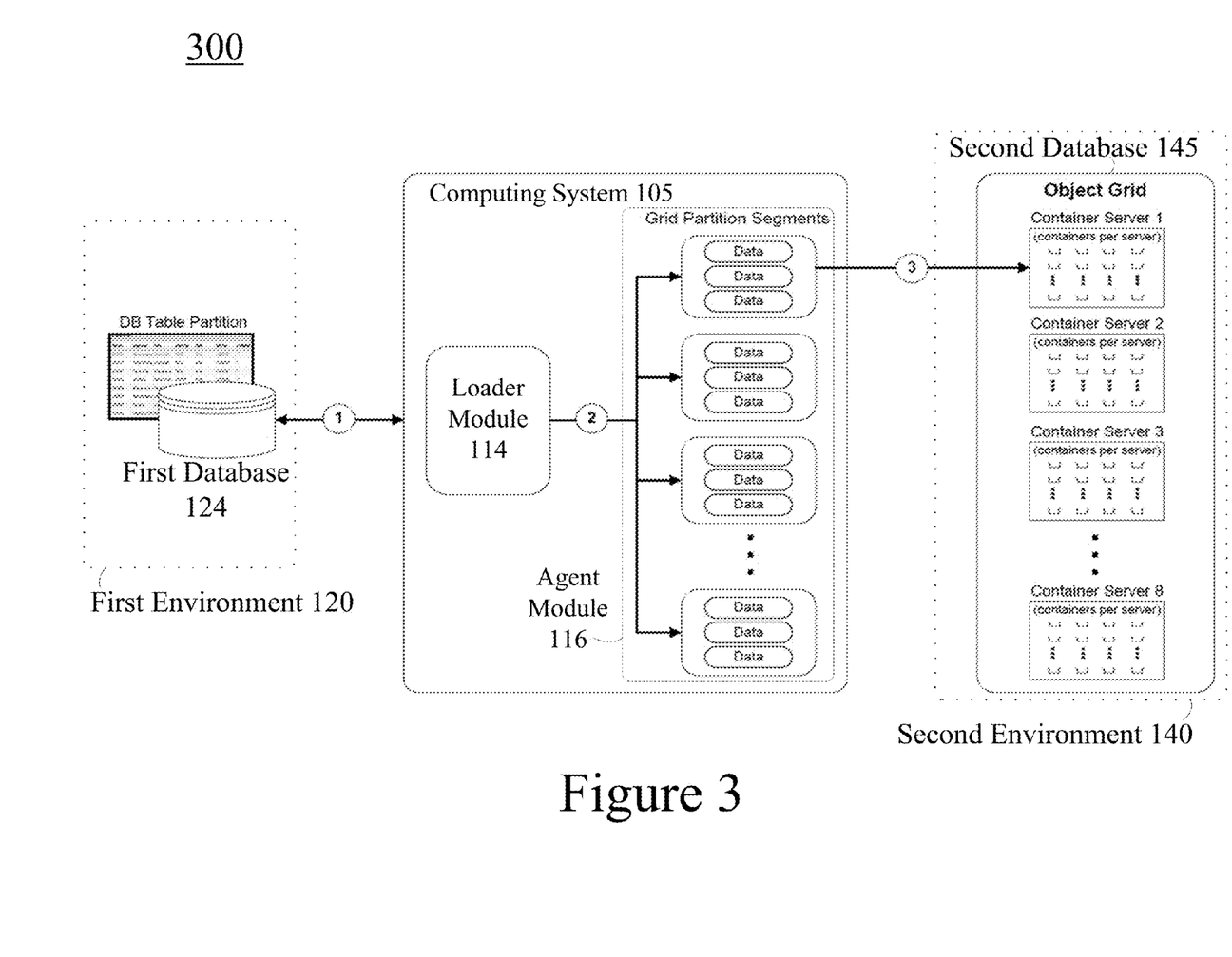
FIG. 3 is a schematic diagram illustrating the exemplary system and process flow shown in FIGS. 1 and 2.

The exemplary datagrid loading system 100 and components thereof shown in FIG. 1, along with the Tables 1 and 2 and information pertaining to thereto, will now be described in detail with reference to the exemplary process flow 200 of FIG. 2 and exemplary schematic diagram 300 of FIG. 3. As illustrated in FIGS. 2 and 3, there are three phase circles incrementing from 1 to 3. In FIG. 2, each phase circle 1, 2, and 3 identifies a dash-line box that contains a block grouping. For instance, phase one contains blocks 220 and 230; phase two contains blocks 240, 250, and 260; and phase three contains blocks 270 and 280.

Consistently, in FIG. 3, each phase circle identifies general logical locations within the exemplary datagrid loading system 100 via the exemplary schematic diagram 300 that the block groupings of FIG. 2 are executed. Thus, as the operations of the exemplary process flow 200 are described below, the general logical locations of the operation may also be identified in FIG. 3 via the phase circles 1, 2, and 3. The general logical locations are for illustrative purposes only, and are not intended to be limiting as a particular location for the operations described in FIG. 2.

In the below exemplary description, the first environment 120 may be a relational database management system (RDBMS) while the second environment 140 may be a main memory database system (MMDB). In turn, the first database 124 may be a SQL database while the second database 145 may be an eXtremeDB.

The process flow 200 starts in phase one. In phase one, the computing system 105 identifies 220 at least one key of a RDBMS model for a SQL database 124 of the first environment 120. Thus, the process flow may acquire Table 1 and select key 1 ("ORD_NO") as an identifier for any data read from SQL database 124. Note that the phase circle 1 of FIG. 3 is located between the SQL database 124 and the computing system 105 to illustrate communication, such as acquiring Table 1 and transferring read commands and accessed data, between these two devices.

At this time, the computing system 105 may scan system characteristics in support of determining an optimized batch size. That is, the computing system 105 may identify what network resources and environment processing resources are available to transfer data and based on the identified resources the computer system may adjust the batch size (e.g., if resources are available for the transfer even though the batch size has not met the predetermined size, then the batch size may be optimized so that resource are continuously in use). For example, due to the results from a series of simulations, the computing system 105 may have built a table that relates different batch sizes to particular processing capabilities of the computing system 105 and the network characteristics of the second environment 140 and network 160. Thus, using the scanned system characteristic, the computing system 105 may select the corresponding optimized batch size from the table (in this case, the computing system 105 has selected 1,000).

With key 1 selected the computing system 105 accesses 230 the SQL database 124 to read data blocks with a database table partition according to the key 1. Particularly, the JDBC driver of the application module 112 fetches the data blocks on a row-by-row basis from the SQL database 124 via the key 1. Note that the JDBC driver reads the data block from the first database 124 data in their native SQL addressing format.

Next, the computing system 105 proceeds to phase two. In phase two, the computing system 105 accumulates 240 the data read from the SQL database 124 in a master queue, while maintaining the native SQL addressing format. For example, when accumulating the data from the SQL database 124, the log of the computer system 105 may including the following:

"2013-02-15 12:30:51,313: INFO com.vzw.cache.gridaccessor.extremescale.AbstractWXSCacheManager-[pool-3-thread-1]-Total Model count: 50281: Inserted Grid Records count: 0: Total Number Of Inserter Threads started: 5"

Note that the text "Total Model count: 50281" shows the cumulative number of records read from database 124, and the text "Inserted Grid Records count 0" shows the cumulative records inserted into eXtremeDB database 145.

As the master queue populates the integrated heuristic partitions 250 the data blocks in the master queue according to the key 1. At this point, the integrated heuristic is reading the data blocks, which are in the native SQL addressing format, via a key 1 (also related to the SQL database) and splitting the data blocks into a eXtremeDB addressing format (e.g., a distinct addressing format from the SQL addressing format). Note that the phase circle 2 of FIG. 3 is located between the loader module 114 and the agent module 116 to illustrate the partitioning of accumulated data into datagrid partition segments (e.g., buckets).

In this way, the computing system 105 may accumulate large data amounts (e.g., 40,000 records) in a master queue while distributing the data into multiple datagrid partition segments (e.g., 1,000 or 7,000 segments). Note that the accumulating in the loader module 114 while assigning partitions is an integrated operation that improves the throughput of large amounts of data. For example, when assigning the data from the master queue into multiple datagrid partition segments, the log of the computer system 105 may including the following:

"2013-02-15 12:30:59,629: INFO WXSPartitionDataInsertCallable-[pool-4-thread-1]-RPCINFO: MAIN-MAP, agent: WXSCustomerInsertAgent, map: CustomerMap, partition: 4294967292, numObjects: 10010: Total Time Taken for Agent in nanos: 8315950508", "2013-02-15 12:30:59,629: INFO WXSPartitionDataInsertCallable-[pool-4-thread-9]-RPCINFO: MAINMAP, agent: WXSCustomerInsertAgent, map: CustomerMap, partition: 4, numObjects: 10002: Total Time Taken for Agent in nanos: 6619593962", and "2013-02-15 12:31:02,395: INFO WXSPartitionDataInsertCallable-[pool-4-thread-10]-**RPCINFO: MAINMAP, agent: WXSCustomerInsertAgent, map: CustomerMap, partition: 4294967290, numObjects: 10122: Total Time Taken for Agent in nanos: 9395308352"

The text "partition:" followed by a number shows the partition or segment number of the eXtremeDB database 145. The text "numObjects:" followed by a number shows the number of records meant for that partition or segment after the hash heuristic is applied.

Further, the computing system 105 also monitors 260 data storage levels of each datagrid partition segment so that when the data stored is equal to the optimized batch size selected in phase 1 (e.g., the datagrid partition segment is at capacity).

The computing system 105 next proceeds to phase three. In phase three, the computing system 105 pushes 270 each datagrid partition segment at capacity (e.g., each filled bucket) to an eXtremeDB database 145 in a second environment 140. The eXtremeDB database 145 then processes 280 each pushed datagrid partition segment directly into a corresponding container without additional processing (e.g., the second environment 140 does not have to convert and re-address the data because the addressing of the bucket already corresponds to the second environment 140). Note that the phase circle 3 of FIG. 3 is located between the computing system 105 and the eXtremeDB database 145 to illustrate the pushing of datagrid partition segments.

The eXtremeDB database 145 may further logically order or re-order the data within the containers, which now include data from the buckets, by utilizing a local address scheme so that the container is organized for faster access. In this way, a total number of datagrid-insert/update calls (commands that store or retrieve data) by the computing system 105 are reduced by sending data in batches, since the batching groups the data into a signal call (one read and insert per batch, instead of inserting data row-by-row).

Finally, the process 200 ends.

In effect, the computing system 105 enables the conversion of "many" database partition segments of the SQL database 124 into "many" datagrid partition segments of the eXtremeDB 145, which reduces the use of processing resources on both databases. Large amounts of data are moved from the SQL database 124 and to the eXtremeDB 145 efficiently, allowing the operational amount of time to be reduced in comparison to moving data by a row-by-row read and a sequential processing. For example, it was identified that the above exemplary datagrid loading system 100 was able to move 3.5 terabytes of data in less than 11 hours.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
  a device including a processor and a memory with a management application having an integrated heuristic, wherein instructions of the management application when executed by the processor cause the processor to:
    accumulate data having a first addressing format of a first database, the data configured to be and include an identifier that is particular to the first database, wherein the accumulate data includes accumulating by the queue the data from the first database while maintaining the first addressing format of the first database, and splitting the data from the queue by the integrated heuristic into the buckets according to the corresponding containers of second addressing format of the second database;
    distribute, by the integrated heuristic, the data having the first addressing format into buckets of a queue according to the identifier of the first database and associated with corresponding containers of a second addressing format of a second database having a different database scheme than the first database; and
    push the distributed data from the buckets to the corresponding containers of the second database without re-addressing the data at the second database, wherein the push the distributed data includes pushing each bucket to the second database when an amount of the data in the bucket equals a predefined capacity, and inserting buckets pushed to the second database without additional processing into the corresponding containers based on the distribution of data by the integrated heuristic,
  wherein the first database is configured to be a relational database management system and the second database is configured to be a main memory database system, and wherein the buckets with data from the relational database management system are transferred to the main memory database system.

2. The system of claim 1, wherein each of the buckets is configured with the predefined capacity.

3. The system of claim 1, wherein each bucket is configured with the predefined capacity based on an analysis by the application of network characteristics between the device and the second database.

4. The system of claim 1, wherein the first addressing format of the first database includes a SQL addressing format that is different than the second addressing format of the second database.

5. A method, comprising:
accumulating, by a processing unit, data having a first addressing format of a first database, the data including an identifier particular to the first database, wherein the accumulating the data includes accumulating by the queue the data from the first database while maintaining the first addressing format of the first database, and splitting the data from the queue by the integrated heuristic into the buckets according to corresponding containers of the second addressing format of the second database;
distributing, by an integrated heuristic, the data having the first addressing format into buckets of a queue according to the identifier of the first database and associated with corresponding containers of a second addressing format of a second database having a different database scheme than the first database; and
pushing the distributed data from the buckets to the corresponding containers of the second database without re-addressing the data at the second database, wherein the pushing the distributed data includes pushing each bucket to the second database when an amount of the data in the bucket equals a predefined capacity, and inserting the buckets pushed to the second database without additional processing into the corresponding containers based on the distributing of data by the integrated heuristic,
wherein the first database is configured to be a relational database management system and the second database is configured to be a main memory database system, and wherein the buckets with data from the relational database management system are transferred to the main memory database system.

6. The method of claim 5, wherein each bucket is configured with the predefined capacity.

7. The method of claim 5, the method further comprising:
analyzing network characteristics between the device and the second database to determine the predefined capacity.

8. The method of claim 5, wherein the first addressing format of the first database includes a SQL addressing format that is different than the second addressing format of the second database.

9. A non-transitory computer-readable medium tangibly embodying computer-executable instructions that when executed by a processor cause the processor to:
accumulate data having a first addressing format of a first database, the data being and including an identifier particular to the first database, wherein the accumulate data includes accumulating by the queue the data from the first database while maintaining the first addressing format of the first database, and splitting the data from the queue by the integrated heuristic into the buckets according to the corresponding containers of the second addressing format of the second database;
distribute, by an integrated heuristic, the data having the first addressing format into buckets of a queue according to the identifier of the first database and associated with corresponding containers of a second addressing format of a second database having a different scheme than the first database; and
push the distributed data from the buckets to the corresponding containers of the second database without re-addressing the data at the second database, wherein the push the distributed data includes pushing each bucket to the second database when an amount of the data in the bucket equals a predefined capacity, and inserting the buckets pushed to the second database without additional processing into corresponding containers based on the distribution of data by the integrated heuristic,
wherein the first database is configured to be relational database management system and the second database is configured to be a main memory database system, and wherein the buckets with data from the relational database management system are transferred to the main memory database system.

10. The non-transitory computer-readable medium of claim 9, wherein each bucket is configured with the predefined capacity.

11. The non-transitory computer-readable medium of claim 9, wherein the instructions further cause the processor to:
analyze network characteristics between the device and the second database to determine the predefined capacity.

* * * * *